US011404958B2

United States Patent
Hsu

(10) Patent No.: US 11,404,958 B2
(45) Date of Patent: Aug. 2, 2022

(54) RANDOM CODE GENERATOR AND ASSOCIATED RANDOM CODE GENERATING METHOD

(71) Applicant: eMemory Technology Inc., Hsin-Chu (TW)

(72) Inventor: Ching-Hsiang Hsu, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 572 days.

(21) Appl. No.: 16/421,820

(22) Filed: May 24, 2019

(65) Prior Publication Data
US 2019/0369966 A1 Dec. 5, 2019

Related U.S. Application Data

(60) Provisional application No. 62/677,196, filed on May 29, 2018.

(51) Int. Cl.
| | | |
|---|---|---|
| G06F 7/58 | (2006.01) | |
| H02M 3/07 | (2006.01) | |
| G05F 1/46 | (2006.01) | |
| G11C 16/30 | (2006.01) | |
| H03B 29/00 | (2006.01) | |

(52) U.S. Cl.
CPC .............. *H02M 3/07* (2013.01); *G05F 1/465* (2013.01); *G06F 7/588* (2013.01); *G11C 16/30* (2013.01); *H03B 29/00* (2013.01)

(58) Field of Classification Search
CPC ........................................................ G06F 7/588
See application file for complete search history.

(56) References Cited

U.S. PATENT DOCUMENTS

| | | | |
|---|---|---|---|
| 5,303,190 A | * | 4/1994 | Pelley, III ............. G11C 11/417 365/189.11 |
| 9,613,714 B1 | | 4/2017 | Wong et al. |
| 2017/0272258 A1 | | 9/2017 | Tanamoto et al. |
| 2017/0277459 A1 | * | 9/2017 | Rodriguez .......... G11C 11/2273 |
| 2017/0301406 A1 | * | 10/2017 | Wong ...................... G11C 16/14 |
| 2018/0039484 A1 | * | 2/2018 | La Fratta ............ G11C 11/4096 |

FOREIGN PATENT DOCUMENTS

WO    WO2017117663 A1    7/2017

OTHER PUBLICATIONS

Office Action issued by Taiwan Intellectual Property Office dated Jun. 22, 2020.
European Patent Office "Searcg Report" dated Oct. 15, 2019, EPO.

* cited by examiner

*Primary Examiner* — Chuong D Ngo
(74) *Attorney, Agent, or Firm* — WPAT, PC

(57) ABSTRACT

A random code generator includes a power source, a sensing circuit, a first memory cell and a second memory cell. A first terminal of the first memory cell is connected with the power source. A second terminal of the first memory cell is connected with the sensing circuit. A first terminal of the second memory cell is connected with the power source. A second terminal of the second memory cell is connected with the sensing circuit. The power source provides a supplying voltage to both the first memory cell and the second memory cell during an enrollment. A random code is then determined according to the resistance difference between the first memory cell and the second memory cell after the enrollment.

3 Claims, 4 Drawing Sheets

RANDOM CODE GENERATOR AND ASSOCIATED RANDOM CODE GENERATING METHOD

This application claims the benefit of U.S. provisional application Ser. No. 62/677,196, filed May 29, 2018, the subject matter of which is incorporated herein by reference.

FIELD OF THE INVENTION

The present invention relates to a random code generator and an associated control method, and more particularly to a random code generator with a non-volatile memory and an associated random code generating method.

BACKGROUND OF THE INVENTION

A physically unclonable function (PUF) technology is a novel method for protecting the data of a semiconductor chip. That is, the use of the PUF technology can prevent the data of the semiconductor chip from being stolen. In accordance with the PUF technology, the semiconductor chip is capable of providing a random code. This random code is used as a unique identity code (ID code) of the semiconductor chip to achieve the protecting function.

Generally, the PUF technology acquires the unique random code of the semiconductor chip according to the manufacturing variation of the semiconductor chip. This manufacturing variation includes the semiconductor process variation. That is, even if the PUF semiconductor chip is produced by a precise manufacturing process, the random code cannot be duplicated. Consequently, the PUF semiconductor chip is suitably used in the applications with high security requirements.

Moreover, U.S. Pat. No. 9,613,714 disclosed a one time programming memory cell and a memory array for a PUF technology and an associated random code generating method. In this literature, a one time programmable memory cell and a memory array are manufactured according to the semiconductor process variation. After the program cycle, the unique random code is generated.

SUMMARY OF THE INVENTION

An embodiment of the present invention provides a random code generator. The random code generator includes a power source, a sensing circuit, a first memory cell and a second memory cell. The sensing circuit further comprises a first sense amplifier, a second sense amplifier. A first terminal of the first memory cell is connected with the power source. A second terminal of the first memory cell is connected with the first sense amplifier. A first terminal of the second memory cell is connected with the power source. A second terminal of the second memory cell is connected with the second sense amplifier. The power source provides a supplying voltage to both the first memory cell and the second memory cell during an enrollment. A random code is then determined according to the resistance difference between the first memory cell and the second memory cell after the enrollment.

Another embodiment of the present invention provides a random code generating method for the random code generator. If a first current generated by the first memory cell exceeds a threshold value, the first sense amplifier verifies that the enrollment is completed. If a second current generated by the second memory cell exceeds the threshold value, the second sense amplifier verifies that the enrollment is completed.

Another embodiment of the present invention provides a random code generator. The random code generator includes a power circuit, a sensing circuit and a memory cell array. The memory cell array includes a first memory cell and a second memory cell. A first terminal of the first memory cell is connected with the power circuit through a first power line. A second terminal of the first memory cell is connected with the sensing circuit through a first bit line. A third terminal of the first memory cell is connected with a first word line. A first terminal of the second memory cell is connected with the power circuit through a second power line. A second terminal of the second memory cell is connected with the sensing circuit through a second bit line. A third terminal of the second memory cell is connected with the first word line. During an enrollment, the first word line receives an on voltage, the power source provides a supplying voltage to the first power line and the second power line, and a random code is then determined according to the resistance difference between the first memory cell and the second memory cell after the enrollment.

Another embodiment of the present invention provides a random code generating method for the random code generator. If a first current generated by the first memory cell exceeds a threshold value, a first sense amplifier of the sensing circuit verifies that the enrollment is completed. If a second current generated by the second memory cell exceeds the threshold value, a second sense amplifier of the sensing circuit verifies that the enrollment is completed.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

In the semiconductor process of fabricating a memory array, the uniformity is always the must for producing high yield memory array. Generally, the memory cell array is composed of resistive memory cells or capacitive memory cells. In addition, the memory cell array can be constituted of a non-volatile memory.

However, no matter how precisely the memory cells are fabricated, by nature, a minute difference between two adjacent memory cells exists randomly. Therefore, the present invention utilizes a circuit technique to amplify this random minute difference to a significant difference. In addition, a sensing circuit can sense this difference so as to generate a random code.

Figure 1:
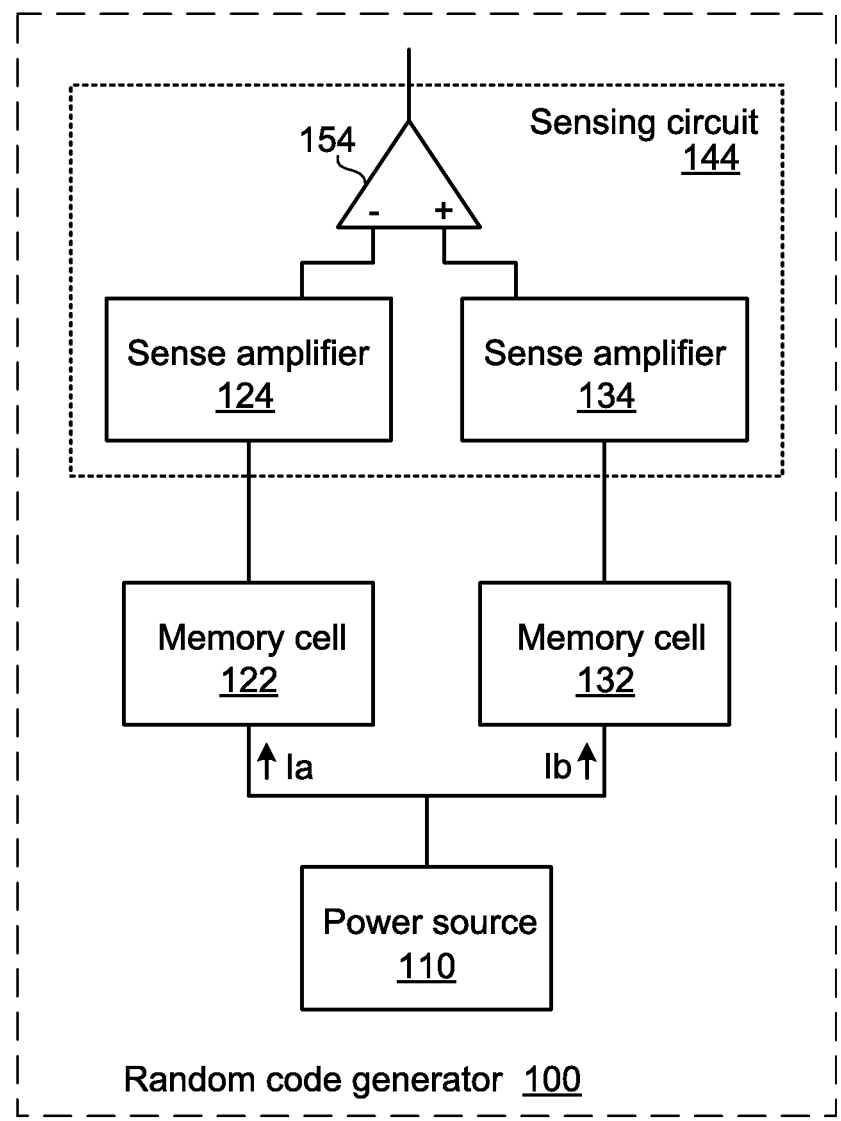
FIG. 1 is a schematic circuit block diagram illustrating a random code generator according to an embodiment of the present invention.

FIG. 1 is a schematic circuit block diagram illustrating a random code generator according to an embodiment of the present invention. The random code generator 100 comprises a pair of memory cells 122, 132, a sensing circuit 144, and a power source 110. The sensing circuit 144 further comprises two sense amplifiers 124, 134 and a comparator 154. A first terminal of the memory cell 122 is connected with the power source 110. A second terminal of the memory cell 122 is connected with the sense amplifier 124. A first terminal of the memory cell 132 is connected with the power source 110. A second terminal of the memory cell 132 is connected with the sense amplifier 134. The sense amplifiers 124 and 134 are both connected with the comparator 154. The power source 110 provides a variable DC supplying voltage. And the variable DC supplying voltage reduces when the resistance of the memory cell 122 or the resistance of the memory cell 132 reduces.

Firstly, an enrollment process is performed. During the enrollment, the power source 110 provides the supplying voltage to both of the two memory cells 122 and 132, and the sensing circuit 144 provide a ground voltage. The two memory cells 122 and 132 are resistive memory cells or capacitive memory cells.

In case that the supplying voltage is large enough (e.g., 9V), two currents Ia and Ib are generated and flow through the two memory cells 122 and 132 respectively. Since the minute difference exists between the two memory cells 122 and 132, there is a minute difference between the two currents Ia and Ib. Moreover, as the two currents Ia and Ib continuously flow through the two memory cells 122 and 132, the resistance of one memory cell will reduce faster than the resistance of the other memory cell due to the different current stresses between these two memory cells.

As the resistance of one memory cell becomes lower and the state of the memory cell changes, the current flowing through it becomes larger, which will cause the drop of the supplying voltage of the power source 110. As the supplying voltage of the power source 110 drops, the current flowing through the other memory cell will greatly reduce. Consequently, the resistance of the other memory cell maintains (or unchanged) at previous value and the state will not change.

On the contrary, the larger current continuously flow through the memory cell with lower resistance and cause the continuous change of the resistance of the memory cell until the sense amplifier reacts. That is, the two sense amplifiers 124 and 134 continuously monitor the received currents Ia and Ib. When the current flowing through one memory cell exceeds a threshold value, the corresponding sense amplifier reacts.

In other words, when one of the two sense amplifiers 124 and 134 reacts, it means that the enrollment process of the random code generator 100 is completed. Meanwhile, the difference between the two memory cells 122 and 132 can be measured by the sense amplifiers 124 and 134.

During a read operation, the power source 110 provides a read voltage to both of the memory cells 122 and 132, and the sensing circuit 144 provide the ground voltage. Since the read voltage is lower (e.g., 0.8V), the resistance of the memory cell 122 and the resistance of the memory cell 132 are kept unchanged. Meanwhile, the memory cell in the high resistance state generates a lower read current, and the memory cell in the low resistance state generates a higher read current. After the sense amplifiers 124 and 134 judge the states of the two memory cells 122 and 132, the comparator 154 compares the states of the two memory cells 122 and 132 and outputs one bit of a random code. In this way, the minute difference between the memory cell 122 and 132 is distinguished and the one bit of a random code is determined accordingly.

For example, if the read current from the memory cell 122 is higher than the read current from the memory cell 132, the memory cell 122 is in the low resistance state and the memory cell 132 is in the high resistance state. The random code is then registered(determined) as a first storage state, e.g., "0" state. Whereas, if the read current from the memory cell 122 is lower than the read current from the memory cell 132, the memory cell 122 is in the high resistance state and the memory cell 132 is in the low resistance state. The random code is then registered(determined) as a second storage state, e.g., "1" state.

In this embodiment, the power source 110 provides a variable DC supplying voltage, and the variable DC supplying voltage is changed with the resistance changes of the memory cells 122 or 132. For example, the power source 110 is a charge pump circuit with a capacitor. After the charge pump circuit provides a specified number of charges and stores the charges in the capacitor, the capacitor can provide the supplying voltage.

During the enrollment, the supplying voltage is provided from the capacitor to the two memory cells 122 and 132. As the resistance of one memory cell becomes lower and the state of the memory cell changes, a great number of charges (i.e. higher current) flow through the memory cell, which will drop the supplying voltage very quickly. As the supplying voltage drops, only a small number of charges (i.e. lower current) flow through the other memory cell and the state is not changed. Consequently, the sense amplifiers 124 and 134 judge whether the enrollment is completed according to the magnitudes of the currents.

Alternatively, the power source 110 can be a fixed current source for providing a fixed DC current to the two memory cells 122 and 132. Consequently, the supplying voltage is provided.

Figure 2A:
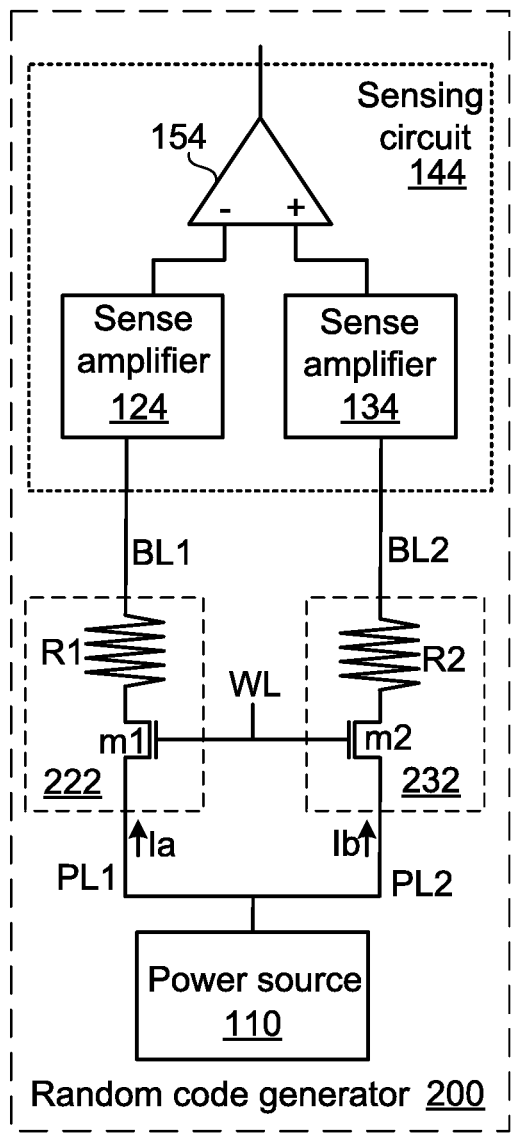
FIGS. 2A and 2B are schematic circuit diagrams illustrating the enrollment of resistive memory cells of a random code generator according to an embodiment of the present invention.
Figure 2B:
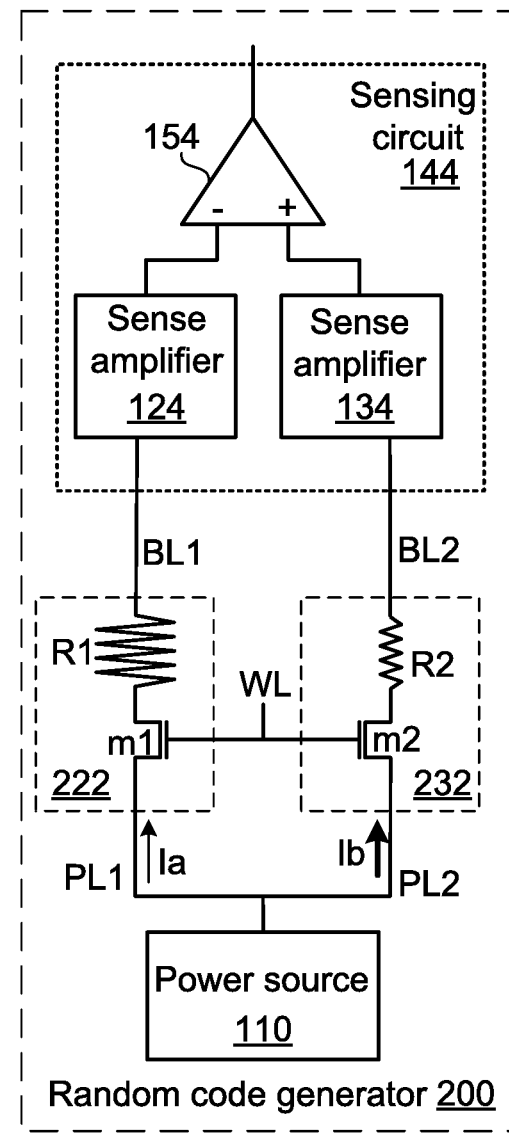

FIGS. 2A and 2B are schematic circuit diagrams illustrating the enrollment of resistive memory cells of a random code generator according to an embodiment of the present invention. The random code generator 200 comprises a pair of memory cells 222, 232, a sensing circuit 144 and a power source 110. The sensing circuit 144 further comprises two sense amplifiers 124, 134 and a comparator 154. In addition, the memory cells 222 and 232 are programmable resistive memory cells which can be programmed either by overstressed current or voltage. The resistive memory cell 222 comprises a resistive element R1 and a select transistor m1. The first terminal of the resistive element R1 is connected with the sense amplifier 124 of the sensing circuit 144 through a bit line BL1. The first drain/source terminal of the select transistor m1 is connected with the second terminal of the resistive element R1. The second drain/source terminal of the select transistor m1 is connected with the power source 110 through a power line PL1. The gate terminal of the select transistor m1 is connected with a word line WL. Similarly, the resistive memory cell 232 comprises a resistive element R2 and a select transistor m2. The structure of the resistive memory cell 232 is identical to the structure of the resistive memory cell 222. The connecting relationships between the components of the resistive memory cell 232 are not redundantly described herein.

Please refer to FIG. 2A. During the enrollment of the random code generator 200, the word line WL receives an on voltage. Consequently, the select transistors m1 and m2 are turned on. Meanwhile, the power source 110 provides the supplying voltage to the resistive element R1 of the resistive memory cell 222 and the resistive element R2 of the resistive memory cell 232 simultaneously, and the sensing circuit 144 provide the ground voltage to the bit lines BL1 and BL2. In case that the supplying voltage is large enough, two currents Ia and Ib start to flow through the resistive element R1 of the resistive memory cell 222 and the resistive element R2 of the resistive memory cell 232, respectively.

For example, the current Ib flowing through the resistive element R2 is higher than the current Ia flowing through the resistive element R1. As the two currents Ia and Ib continuously flow through the resistive element R1 of the resistive memory cell 222 and the resistive element R2 of the resistive memory cell 232, the resistance of the resistive element R2 will change faster than the resistance of the resistive element R1.

As the resistance of the resistive element R2 of the resistive memory cell 232 becomes lower and the state of the resistive memory cell 232 changes, the current Ib flowing through it becomes larger, which will cause the drop of the supplying voltage of the power source 110. As the supplying voltage of the power source 110 drops, the current Ia flowing through the resistive element R1 of the resistive memory cell 222 will greatly reduce. Consequently, the resistance of the resistive memory cell 222 maintains higher and the state will not change.

Please refer to FIG. 2B. The two sense amplifiers 124 and 134 continuously monitor the received currents Ia and Ib. As the current Ib continuously increases and exceeds a threshold value, the sense amplifier 134 reacts. Meanwhile, the enrollment of the random code generator 200 is completed.

During a read operation, the word line WL receives an on voltage to turn on the select transistors m1 and m2. Meanwhile, the power source 110 provides a read voltage to both of the resistive memory cells 222 and 232, and the sensing circuit 144 provides the ground voltage to the bit lines BL1 and BL2. Meanwhile, the resistive element R1 is in the high resistance state and generates a lower read current, and the resistive element R2 is in the low resistance state and generates a higher read current. Consequently, the sense amplifier 124 judges that the resistive memory cell 222 is in the high resistance state, and the sense amplifier 134 judges that the resistive memory cell 232 is in the low resistance state. The comparator 154 then compares the states of the two resistive memory cells 222 and 232 and outputs one bit of a random code (e.g., the second storage state, the "1" state). In this way, the minute difference between the memory cell 222 and 232 is distinguished and the one bit of a random code is determined accordingly.

Figure 3A:
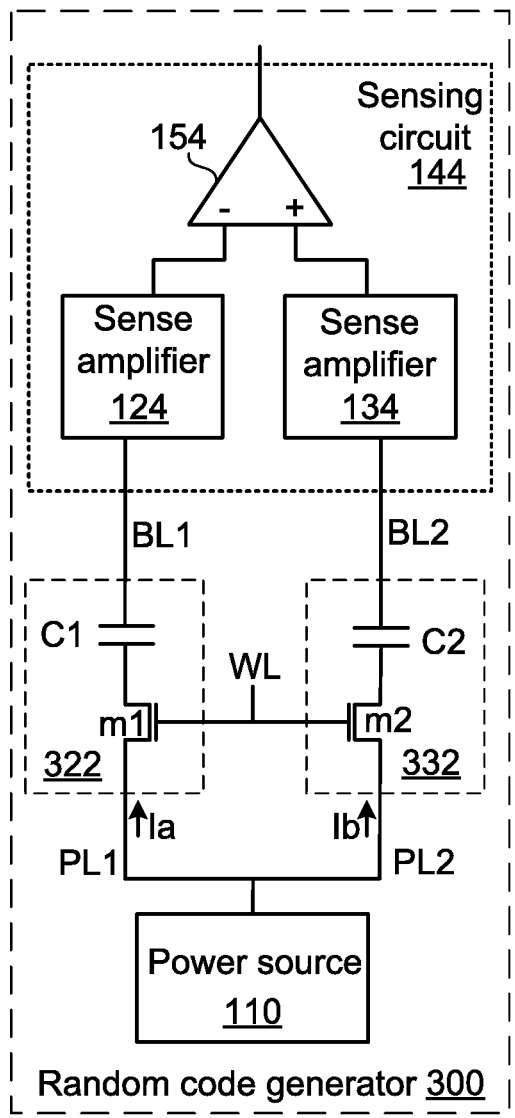
FIGS. 3A and 3B are schematic circuit diagrams illustrating the enrollment of capacitive memory cells of a random code generator according to an embodiment of the present invention.
Figure 3B:
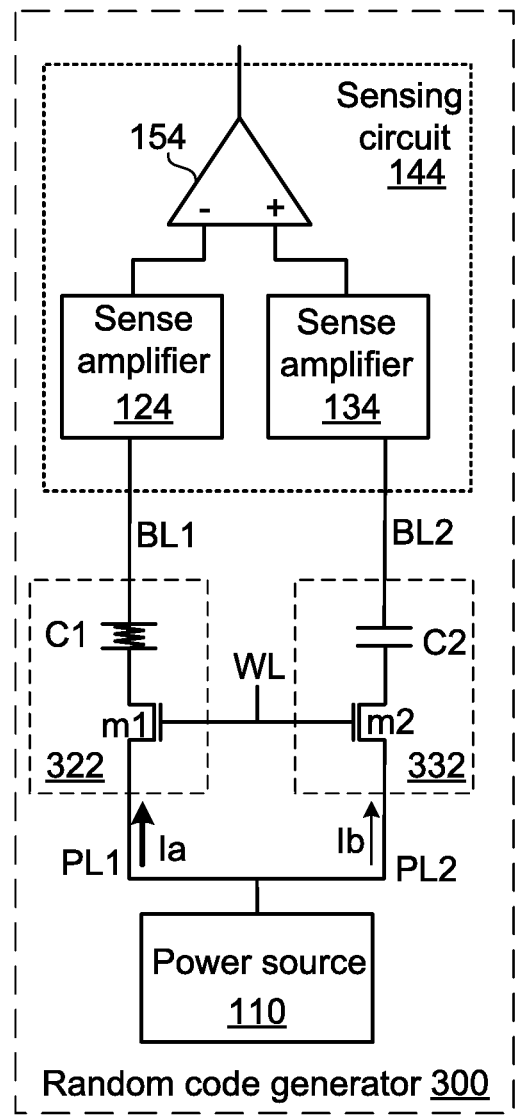

FIGS. 3A and 3B are schematic circuit diagrams illustrating the enrollment of capacitive memory cells of a random code generator according to an embodiment of the present invention. The random code generator 200 comprises a pair of memory cells 322, 332, a sensing circuit 144 and a power source 110. The sensing circuit 144 further comprises two sense amplifiers 124, 134 and a comparator 154. The capacitive memory cell 322 comprises a capacitive element C1 and a select transistor m1. The first terminal of the capacitive element C1 is connected with the sense amplifier 124 through a bit line BL1. The first drain/source terminal of the select transistor m1 is connected with the second terminal of the capacitive element C1. The second drain/source terminal of the select transistor m1 is connected with the power source 110 through a power line PL1. The gate terminal of the select transistor m1 is connected with a word line WL. Similarly, the capacitive memory cell 332 comprises a capacitive element C2 and a select transistor m2. The structure of the capacitive memory cell 332 is identical to the structure of the capacitive memory cell 322. The connecting relationships between the components of the capacitive memory cell 332 are not redundantly described herein.

Please refer to FIG. 3A. During the enrollment of the random code generator 300, the word line WL receives an on voltage to turn on the select transistors m1 and m2. Meanwhile, the power source 110 provides the supplying voltage to the capacitive element C1 of the capacitive memory cell 322 and the capacitive element C2 of the capacitive memory cell 332 simultaneously, and the sensing circuit 144 provides the ground voltage to the bit lines BL1 and BL2. In case that the supplying voltage is large enough, two currents Ia and Ib start to flow through the capacitive element C1 of the capacitive memory cell 322 and the capacitive element C2 of the capacitive memory cell 332, respectively.

For example, the (leakage) current Ia flowing through the capacitive element C1 is higher than the (leakage) current Ib flowing through the capacitive element C2. As the two currents Ia and Ib continuously flow through the capacitive element C1 of the capacitive memory cell 322 and the capacitive element C2 of the capacitive memory cell 332, the dielectric layer of the capacitive element C1 is ruptured due to the thermal runaway caused by large leakage current. Consequently, the resistance of the capacitive element C1 reduces quickly and the state changes.

As the resistance of the capacitive element C1 of the capacitive memory cell 322 becomes lower and the state changes, the current Ia flowing through it becomes larger, which will cause the drop of the supplying voltage of the power source 110. As the supplying voltage of the power source 110 drops, the current Ib flowing through the capacitive element C2 of the capacitive memory cell 332 will greatly reduce. Since the dielectric layer of the capacitive element C2 of the capacitive memory cell 332 is not ruptured, the resistance of the capacitive memory cell 332 maintains higher and the state will not change.

Please refer to FIG. 3B. The two sense amplifiers 124 and 134 continuously monitor the received currents Ia and Ib. As the current Ia continuously increases and exceeds a threshold value, the sense amplifier 124 reacts. Meanwhile, the enrollment of the random code generator 300 is completed.

During a read operation, the word line WL receives an on voltage to turn on the select transistors m1 and m2. Meanwhile, the power source 110 provides a read voltage to both of the capacitive memory cells 322 and 332, and the sensing circuit 144 provide the ground voltage to the bit lines BL1 and BL2. Meanwhile, the capacitive element C1 is in the low resistance state and generates a high read current, and the capacitive element C2 is in the high resistance state generates a lower read current. Consequently, the sense amplifier 124 judges that the capacitive memory cell 322 is in the low resistance state, and the sense amplifier 134 judges that the capacitive memory cell 332 is in the high resistance state. The comparator 154 then compares the states of the two capacitive memory cells 322 and 332 and outputs one bit of a random code (e.g., the first storage state, the "0" state). In this way, the minute difference between the memory cell 322 and 332 is distinguished and the one bit of a random code is determined accordingly.

It is to be noted that the programmable resistive memory cell described above may be selected from a group consisting of metal oxide semiconductor (MOS) capacitor, resistive random-access memory (ReRAM or RRAM), phase-change random access memory (PCRAM), magnetoresistive random-access memory (MRAM) and any non-volatile memory (NVM).

Figure 4:
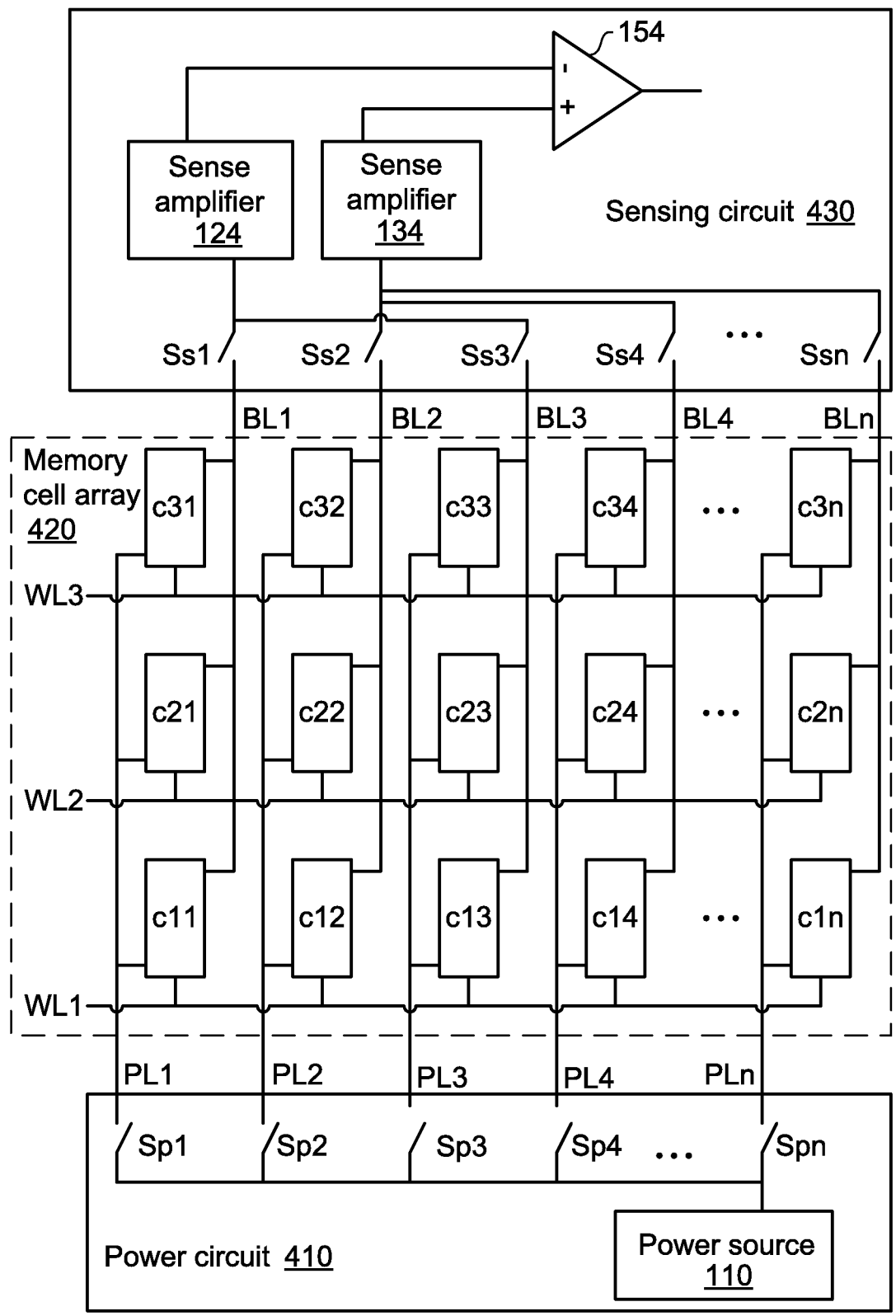
FIG. 4 is a schematic circuit diagram illustrating a random code generator with a memory cell array according to an embodiment of the present invention.

FIG. 4 is a schematic circuit diagram illustrating a random code generator with a memory cell array according to an embodiment of the present invention. As shown in FIG. 4, the random code generator comprises a power circuit 410, a memory cell array 420 and a sensing circuit 430.

In the embodiment of FIG. 4, the memory cell array 420 comprises plural memory cells c11~c3n, which are arranged in a 3×n array. It is noted that the memory cell array of the random code generator is not restricted to the 3×n memory cell array. That is, the size of the memory cell array may be varied according to the practical requirements. Any programmable resistive memory cells, such as the resistive memory cell 222 as shown in FIG. 2A or the capacitive memory cells, such as the capacitive memory cell 322 are shown in FIG. 3A can be as the memory cells c11~c3n.

In the first row of n memory cells c11~c1n, a first terminal of each memory cell is connected with a corresponding power line, and a second terminal of each memory cell is connected with a corresponding bit line. Moreover, in the first row of n memory cells c11~c1n, the third terminals of all memory cells are connected with a word line WL1. For example, the first terminal of the memory cell c11 is connected with the power line PL1, the second terminal of the memory cell c11 is connected with the bit line BL1, and the third terminal of the memory cell c11 is connected with the word line WL1. The connecting relationships between the memory cells c21~c2n and the connecting relationships between the memory cells c31~c3n are similar to the connecting relationships between the memory cells c11~c1n, and are not redundantly described herein.

The power circuit 410 comprises plural switches Sp1~Spn and a power source. The first terminals of the switches Sp1~Spn are connected with the power source 110. The second terminals of the switches Sp1~Spn are connected with the corresponding power lines PL1~PLn.

The sensing circuit 430 comprises plural switches Ss1~Ssn and two sense amplifiers 124, 134 and a comparator 154. The first terminals of the odd-numbered switches Ss1 and Ss3 are connected with the sense amplifier 124. The first terminals of the even-numbered switches are connected with the sense amplifier 134. The second terminals of the switches Ss1~Ssn are connected with the corresponding bit lines BL1~BLn.

In the random code generator of this embodiment, each memory cell of the memory cell array 420 can be enrolled. For example, when the random code generator intends to enroll the memory cells c21 and c22, the corresponding switches Sp1 and Sp2 of the power circuit 410 are closed, and the other switches Sp3~Spn of the power circuit 410 are opened. In addition, the corresponding switches Ss1 and Ss2 of the sensing circuit 430 are closed, and the other switches Ss3~Ssn of the sensing circuit 430 are opened, so that the bit line BL1 is coupled with the sense amplifier 124 and the bit line BL2 is coupled with the sense amplifier 134. In addition, an on voltage is provided to the word line WL2, and an off voltage is provided to the word lines WL1 and WL3.

Then, the power source 110 provides the supplying voltage to the memory cells c21 and c22 through the power lines PL1 and PL2, and the sensing circuit 430 provides the ground voltage to the bit lines BL1 and BL2. Consequently, one of the memory cells c21 and c22 is changed to a low resistance state, and the other is maintained at the high resistance state.

As the current flowing through the memory cell in the low resistance state exceeds the threshold value, the corresponding sense amplifier reacts. Meanwhile, the enrollment of the random code generator is completed.

During the read operation, the corresponding switches Sp1 and Sp2 of the power circuit 410 are closed, and the other switches Sp3~Spn of the power circuit 410 are opened. In addition, the corresponding switches Ss1 and Ss2 of the sensing circuit 430 are closed, and the other switches Ss3~Ssn of the sensing circuit 430 are opened. In addition, an on voltage is provided to the word line WL2, and an off voltage is provided to the word lines WL1 and WL3.

Then, the power source 110 provides the read voltage to the memory cells c21 and c22 through the power lines PL1 and PL2, and the sensing circuit 430 provides the ground voltage to the bit lines BL1 and BL2. Consequently, the sense amplifiers 124 and 134 judge the states of the memory cells c21 and c22. The comparator 154 then compares the states of the two memory cells c21 and c22 and outputs one bit of a random code. In this way, the minute difference between the memory cell c21 and c22 is distinguished and the one bit of a random code is determined accordingly. That is to say, the sensing circuit 430 generates one bit of the random code according to the judging results of the sense amplifiers 124 and 134.

As mentioned above, the random code generator of FIG. 4 can enroll any memory cell pair and determine one bit of the random code according to the state of the memory cell pair. After the memory cell array 420 with the 3×n memory cells c11~c3n are enrolled, the random code generator generates (3×n)/2 bits of the random code.

The random code generator of the present invention may be properly modified to increase the efficiency of the enrollment process and the read operation. For example, in another embodiment, the power circuit 410 is not equipped with any switch and the power circuit 410 comprises (n/2) power sources, wherein n is an even number. Moreover, each power source is directly connected with a pair of power lines. Consequently, the (n/2) power sources are connected with all power lines PL1~PLn.

In another embodiment, the sensing circuit 430 is not equipped with any switch, and the sensing circuit 430 comprises n sense amplifiers. The n sense amplifiers are connected with the corresponding bit lines BL1~BLn.

When the word line WL1 receives the on voltage, the random code generator enrolls the memory cells c1~c1n in the first row. Similarly, the random code generator performs the read operation on the memory cells c11~c1n in the first row and acquires n/2 bits of the random code.

In another embodiment, it is not necessary to use two sense amplifiers 124 and 134 of the sensing circuit 430 to determine one bit of the random code. Instead, either one of the sense amplifiers 122, 134 can be used to determine one bit of the random code. For example, if the sense amplifier 124 judges that the memory cell is in the low resistance state, the first storage state (e.g., the "0" state) is used as one bit of the random code. Whereas, if the sense amplifier 124 judges that the memory cell is in the high resistance state, the second storage state (e.g., the "1" state) is used as one bit of the random code.

Similarly, if the sensing circuit 430 comprises n sense amplifiers and the n sense amplifiers are directly connected with the bit lines BL1~BLn, the n/2 bits of the random code are determined by the odd-numbered sense amplifiers or the even-numbered sense amplifiers.

From the above descriptions, the present invention provides a random code generator and an associated random code generating method. During the enrollment, the unpredictable storage state of a memory cell pair in a memory cell array is generated according to the minute difference between the memory cell pair. Consequently, during the read operation, the storage state of the memory cell pair is verified and used as one bit of the random code.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A random code generating method, comprising steps of:
   providing a supplying voltage by a power source;
   providing a sensing circuit; and
   providing a memory cell array comprising a first memory cell and a second memory cell, wherein a first terminal of the first memory cell is connected with the power circuit through a first power line, a second terminal of the first memory cell is connected with the sensing circuit through a first bit line, a third terminal of the first memory cell is connected with a first word line, a first terminal of the second memory cell is connected with the power circuit through a second power line, a second terminal of the second memory cell is connected with the sensing circuit through a second bit line, and a third terminal of the second memory cell is connected with the first word line;
   receiving an ON voltage by first word line, and receiving the supplying voltage by the first power line and the second power line during an enrollment;
   verifying by a first sense amplifier of the sensing circuit that the enrollment is completed if a first current generated by the first memory cell exceeds a threshold value;
   verifying by a second sense amplifier of the sensing circuit that the enrollment is completed if a second current generated by the second memory cell exceeds the threshold value; and
   determining a random code by the first sense amplifier and the second sense amplifier according to a resistance difference between the first memory cell and the second memory cell after the enrollment.

2. The random code generating method as claimed in claim 1, further comprising steps of:
   providing a read voltage by the power source during a read operation, receiving a first read current by the first sense amplifier, and receiving a second read current by the second sense amplifier;
   determining a first storage state as one bit of a random code if the first read current is higher than the second read current; and
   determining a second storage state as one bit of the random code if the first read current is lower than the second read current.

3. The random code generating method as claimed in claim 1, further comprising steps of:
   providing a read voltage by the poser source during a read operation, receiving a first read current by the first sense amplifier, and receiving a second read current by the second sense amplifier;
   determining a first storage state as one bit of a random code if the first sense amplifier verifies that the first memory cell is in a low resistance state; and
   determining a second storage state as one bit of the random code if the first sense amplifier verifies that the first memory cell is in a high resistance state.

* * * * *